US008681961B2

(12) United States Patent
Stevens

(10) Patent No.: US 8,681,961 B2
(45) Date of Patent: Mar. 25, 2014

(54) CALL CENTER SYSTEM WITH ASSISTED-CONFIGURATION AND METHOD OF OPERATION THEREOF

(75) Inventor: William M. Stevens, Kirkland, WA (US)

(73) Assignee: Zetron, Inc., Redmond, WA (US)

( * ) Notice: Subject to any disclaimer, the term of this patent is extended or adjusted under 35 U.S.C. 154(b) by 0 days.

(21) Appl. No.: 13/449,112

(22) Filed: Apr. 17, 2012

(65) Prior Publication Data

US 2012/0263290 A1 Oct. 18, 2012

Related U.S. Application Data

(60) Provisional application No. 61/476,749, filed on Apr. 18, 2011.

(51) Int. Cl.
*H04M 3/42* (2006.01)

(52) U.S. Cl.
USPC ................................ 379/201.12; 379/265.02

(58) Field of Classification Search
USPC ....................................... 379/201.12, 265.02
See application file for complete search history.

(56) References Cited

U.S. PATENT DOCUMENTS

| | | | | |
|---|---|---|---|---|
| 6,314,459 | B1 | 11/2001 | Freeman | |
| 7,051,093 | B1 | 5/2006 | Lewis et al. | |
| 7,096,490 | B2 | 8/2006 | Xiong et al. | |
| 7,580,370 | B2 | 8/2009 | Boivie et al. | |
| 8,085,808 | B2 | 12/2011 | Brusca et al. | |
| 2004/0022237 | A1 * | 2/2004 | Elliott et al. | 370/356 |

* cited by examiner

*Primary Examiner* — Quynh Nguyen
(74) *Attorney, Agent, or Firm* — Ishimaru & Associates LLP

(57) ABSTRACT

A method of operation of a call center system includes: providing a commissioning terminal in a first locale; providing a hardware device coupled to the commissioning terminal; provisioning a first locale controller from the hardware device by the commissioning terminal; and managing an inter-locale gateway, by the first locale controller, for commissioning a second gateway in a second locale.

19 Claims, 6 Drawing Sheets

CALL CENTER SYSTEM WITH ASSISTED-CONFIGURATION AND METHOD OF OPERATION THEREOF

CROSS-REFERENCE TO RELATED APPLICATION(S)

This application claims the benefit of U.S. Provisional Patent Application Ser. No. 61/476,749 filed Apr. 18, 2011, and the subject matter thereof is incorporated herein by reference thereto.

TECHNICAL FIELD

The present invention relates generally to a call center system, and more particularly to a system for managing set-up and configuration of a call center system for handling a volume of telephone calls that require immediate response.

BACKGROUND ART

Modern communication centers are becoming multimedia-capable and often service both analog and various forms of digital media interactions and transactions. In order to service a large public client base, state-of-the-art telecommunications equipment, software applications, and various dedicated servers are compiled and integrated with state-of-the-art software platforms. In addition to managing very high levels of communication events of various media types, internal management duties must be performed within the center itself. Such duties include tracking and managing historical data, client data, product data, service personnel data, and center configuration data. Moreover, many communication center hosts have multiple service sites that are connected through networks both analog and digital.

Parts of the system are distributed, for example, to agent desktop terminals for contact management. Servers are provided to facilitate transactions in different media types such as chat, e-mail, and so on. Parts of the system are distributed to telephony switches to provide intelligent routing and client interaction capability both from within the system and in some cases into event-sponsoring networks. The system is automated in many respects and updates to configuration parameters of the system are made periodically to add new equipment, reconfigure agent desktop applications, re-assign personnel to various duties, configure local telephony switches for agent level routing, and other duties.

A drawback to this system is that it is mostly internally administered using proprietary code and is platform-dependant. Communication-center administrators access the configuration server through an application program interface from a local area network that is typically Transmission Control Protocol/Internet Protocol (TCP/IP) enabled. The system is not suitable for third-party integration of center configuration data with other third-party management facilities such as customer relations management (CRM) applications.

Thus, a need still remains for a call center system with assisted-configuration. In view of the increased reliance on call centers for support and emergency response, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a call center system including: providing a commissioning terminal in a first locale; providing a hardware device coupled to the commissioning terminal; provisioning a first locale controller from the hardware device by the commissioning terminal; and managing an inter-locale gateway, by the first locale controller, for commissioning a second gateway in a second locale.

The present invention provides a call center system, including: a commissioning terminal in a first locale; a hardware device coupled to the commissioning terminal; a first locale controller provisioned from the hardware device by the commissioning terminal; and an inter-locale gateway, managed by the first locale controller, for commissioning a second gateway in a second locale.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
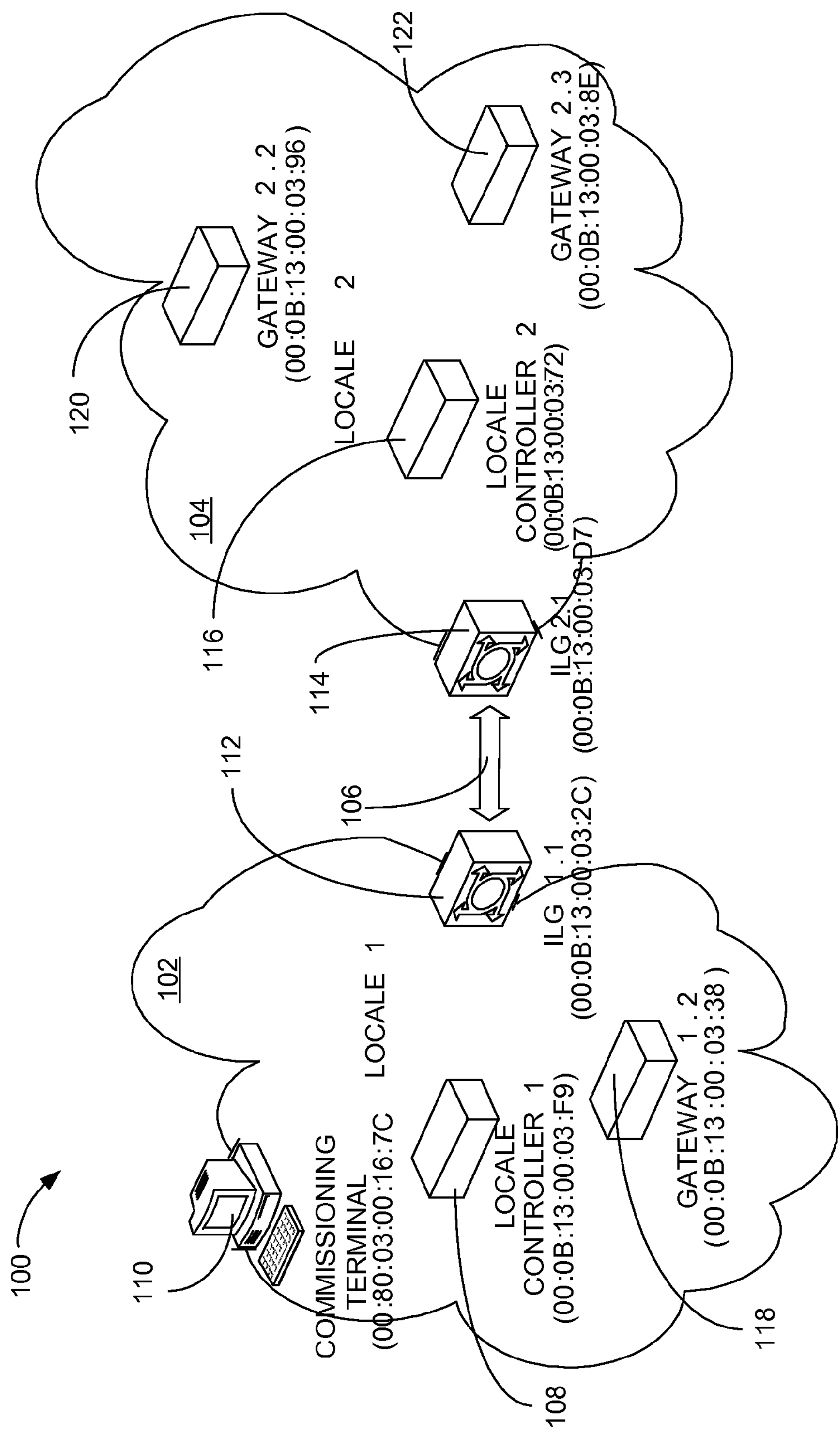
FIG. 1 is a functional block diagram of a call center system with assisted-configuration in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "commissioning" as used in this application means attaching a device, to the network serviced by the call center system, with sufficient hardware and software to respond to network communication at an appropriate communication level. The term "provisioning" as used in this application means customizing a standard hardware platform by the addition of any hardware and software that is required to implement a specific function. The term "configuring" as used in this application means setting the particular parameters and values needed to give the device being configured its intended behavior and must be completed prior to operational use. The phrase "protocol specific message" as used in this application means a message format recognized by devices that can recognize a specific Organizationally Unique Identifier (OUI).

Referring now to FIG. 1, therein is shown a functional block diagram of a call center system 100 with assisted-configuration in an embodiment of the present invention. The functional block diagram of the call center system 100 depicts a first locale 102 of the call center system 100 coupled to a second locale 104 of the call center system 100 by an extended network 106.

The first locale 102 can include a first locale controller 108, which is a Common Processing Platform (CPP) hardware device that has been customized by provisioning the device to communicate with other devices via a local network connection in order to perform management functions in the call center system 100. The first locale controller 108 is coupled to a commissioning terminal 110. The coupling between the commissioning terminal 110 and the first locale controller 108 is a single segment of the local network in order to support the native commissioning of the first locale controller 108.

The first locale controller 108 can be coupled to a first inter-locale gateway 112, which provides an extended network communication capability to the first locale controller 108. The first inter-locale gateway 112 can transport tunneling of the protocol specific messages from the first locale 102 to the second locale 104. A second inter-locale gateway 114 converts a tunneled network communication back to protocol specific messages for delivery to a second locale controller 116.

The first locale controller 108 can provide local management and support tasks for a first gateway 118. The first gateway 118 can provide an interface for operator consoles (not shown), provide a voice recording function, an auxiliary peripheral controller, or a combination thereof.

The second locale controller 116 can provide supervisory functions for a second gateway 120 and a third gateway 122. The supervisory functions can include commissioning, provisioning, and configuring when the second locale controller 116 acts as a proxy server to convey the protocol specific messages from the first locale 102 to the second locale 104.

It has been discovered that the call center system 100 can provide remote configuration and supervision support without manual intervention in the second locale 104. The extended support capabilities of the call center system 100 can provide an expansion capability which allows a distributed call management capability without housing all of the equipment in a central location.

Figure 2:
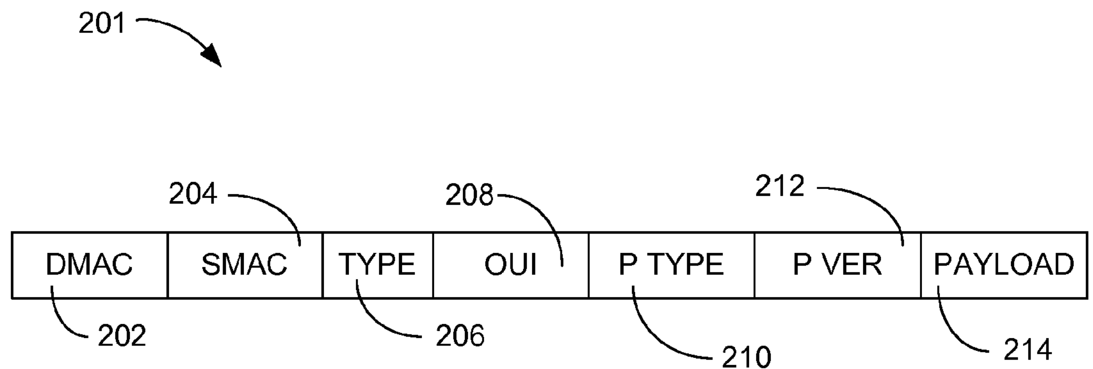
FIG. 2 is a block diagram of a storage element for receiving an assisted-configuration message.

Referring now to FIG. 2, therein is shown a block diagram of a storage element 201 for receiving an assisted-configuration message. The block diagram of the storage element 201 depicts a series of segments for storing a destination media access code (DMAC) 202, a source media access code (SMAC) 204, a type code 206, an organizationally unique identifier (OUI) 208, a protocol type 210, a protocol version 212, and a payload 214.

The storage element 201 can be a hardware register, memory segment, or a combination thereof. The storage element 201 can have compare and forwarding capabilities provided by support hardware (not shown). The destination media access code 202 can be a 48 bit segment used in the exchange of the protocol specific messages. The source media access code 204 can be a 48 bit segment used in the exchange of the protocol specific messages. The type code 206 can be a 16 bit segment for identifying the type of message contained within the payload 214.

The organizationally unique identifier 208 can be a 24 bit segment for identifying the organization promulgating authoritative definition of the protocol specific messages. The protocol type 210 can be an 8 bit segment for identifying the particular code scheme used for protocol specific messages in the payload 214. The protocol version 212 identifies the revision level of the protocol identified by the protocol type segment 210, and which may affect the format and meaning of the information included in the payload 214. The payload 214 can be a segment of variable length between zero bytes and 1481 (decimal) bytes.

It has been discovered that the storage element 201 can provide scalable performance for implementing the call center system 100. In a high performance system, the entirety of the storage element 201 might be implemented in a hardware application specific integrated circuit or in a less demanding environment the storage element 201 might be a small memory supported by a processor. In either implementation, the storage element 201 provides a flexible message handling and forwarding element that can be provisioned in any of the devices managed by the first locale controller 108 of FIG. 1 or the second locale controller 116 of FIG. 1.

Figure 3:
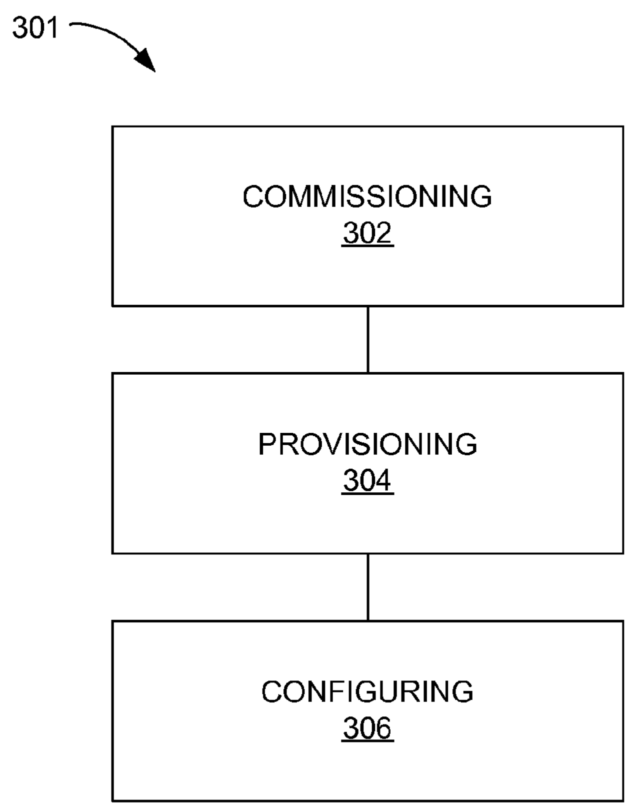
FIG. 3 is a flow chart of a configuration process for call center management.

Referring now to FIG. 3, therein is shown a flow chart of a configuration process 301 for call center management. The flow chart of the configuration process 301 depicts a commissioning module 302, a provisioning module 304 and a configuring module 306.

The commissioning module 302 includes the process of the commissioning terminal 110 of FIG. 1, which can perform a broadcast transmission of a protocol specific discovery message. The first locale controller 108 of FIG. 1 and any other devices that recognize the protocol specific discovery message will respond.

The commissioning terminal 110 will recognize the first locale controller 108 by its known and fixed response address. The commissioning terminal 110 can send a commissioning message to the first locale controller 108 via a unicast message. By replying to the commissioning message, the first locale controller 108 has accepted the commissioning and the commissioning process of the first locale controller 108 is complete. This process can be repeated for the other devices within the first locale 102 of FIG. 1.

The provisioning module 304 performs the process of bringing the devices, which have been previously commissioned, on-line in preparation for the configuration process of the configuring module 306. The provisioning module 304 can be pre-determined and scripted for automatic implementation or it can allow manual intervention in order to update the call center system 100 of FIG. 1. The manual aspect of the provisioning module 304 is useful during replacement of devices that might have failed or are due for maintenance. During the provisioning process, a device will be provided with parametric address information for its identity on the local network (not shown) and well as a nick-name, and the definition of the specific call center function to be performed by the device.

The configuring module 306 updates the previously provisioned devices with the information they need to perform their network tasks. This information may include but is not limited to the number of devices the configured device will interact with. As an example, if a device is provisioned as a voice-logging gateway (not shown), the number and communication addresses of all of the attached operator consoles can be provided. This allows the voice-logging gateway to allocate its resources in order to service all of the attached operator consoles.

It has been discovered that the structure and combination of the commissioning module 302, the provisioning module 304 and the configuring module 306 provides a flexible and automatic process to bring the call center system 100 on-line and functioning while providing a way to manually intervene with the management process when required. This flexibility has been extended to allow support for remote locales without adding a travel burden to the managing personnel.

Figure 4:
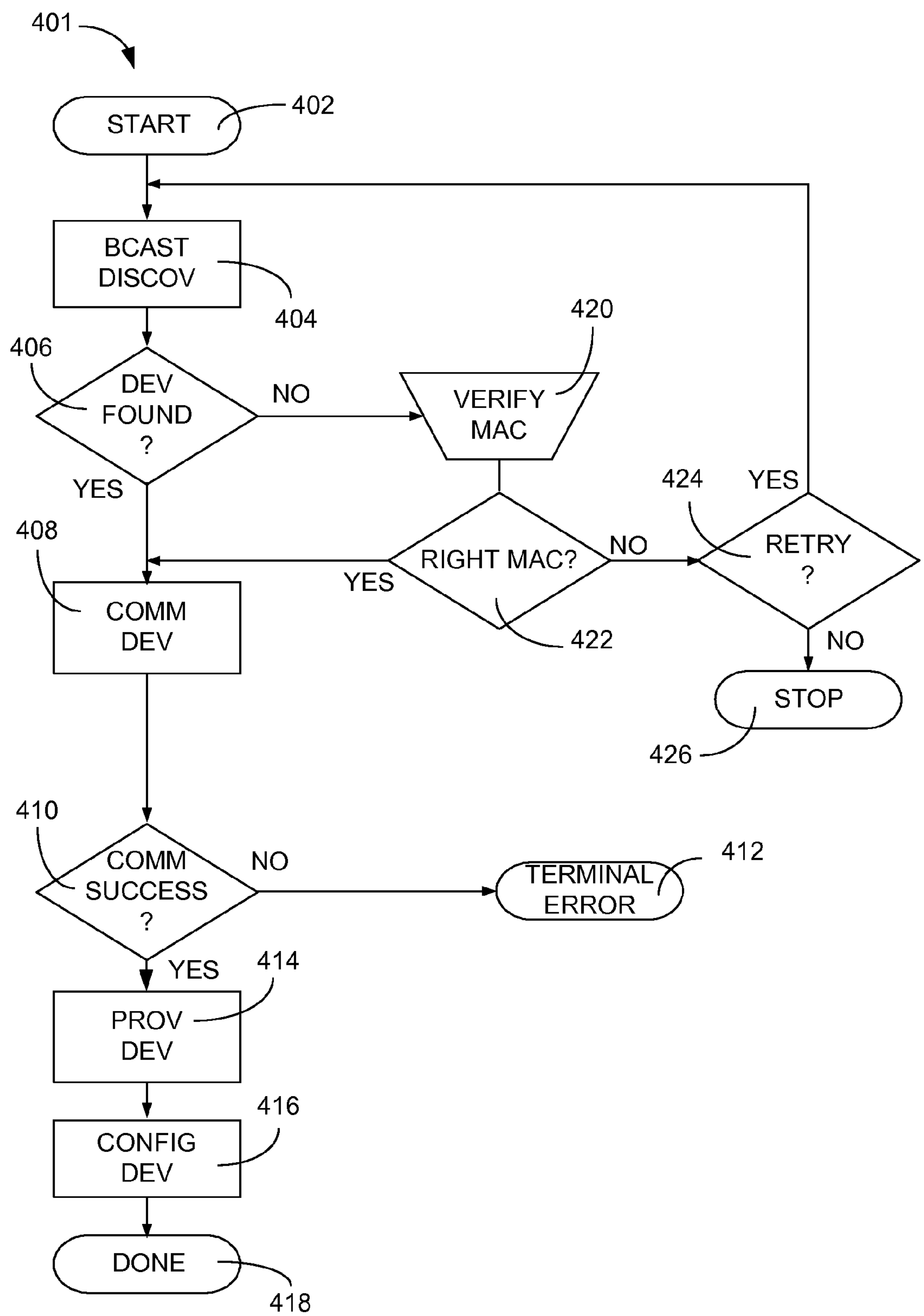
FIG. 4 is a flow chart of the assisted-configuration of the present invention.

Referring now to FIG. 4, therein is shown a flow chart of an assisted-configuration 401 of the present invention. The flow chart of the assisted-configuration 401 depicts a process start 402, which can represent an initiation of a manual configuration or re-configuration of the call center system 100 of FIG. 1. The flow proceeds to a broadcast discovery message module 404.

The broadcast discovery message module 404 can be initiated from the commissioning terminal 110 of FIG. 1. The broadcast discovery message module 404 emits a broadcast message onto the network of the first locale 102 which solicits a response from all of the devices that support the protocol specific message format. The responding devices can be shown on the display of the commissioning terminal 110 along with the status of their commissioning, provisioning and configuration. It is understood that other information about the responding devices can also be displayed, such as but not limited to network addresses, device type, and device nick-names.

The flow then proceeds to a device found decision module 406. The device found decision module 406 sorts the response messages to determine whether a specific device is among the respondents. If the desired device has responded appropriately the flow proceeds to a commission device block 408.

The commission device block 408 sends a unicast message to the specific respondent that was selected. An exchange will ensue between the commissioning terminal 110 and the target device, which can be the locale controller 108 of FIG. 1 or some other gateway device in the first locale 102 of FIG. 1. Once the unicast message has been sent and a response received or time-out occurred, the flow proceeds to a commission successful decision module 410.

The commission successful decision module 410 can determine whether an appropriate response was returned from the targeted device. If it is determined that the response to the commissioning unicast message was incorrect or timed-out due to no response, the flow proceeds to a terminal error module 412. The terminal error module 412 provides an indication of manual intervention required. Some indication of the error type can also be provided. The errors can include time-out, incorrect source address, garbled message due to more than one respondent, bit errors in the message, or the like.

If the commission successful decision module 410 determines that the commissioning was successful, the status of the commissioning is updated on the commissioning terminal 110 and the flow proceeds to a provision device module 414. The provision device module 414 can automatically provide the necessary information for the targeted device to be put on-line and assume the desired network behavior. The provision device module 414 can transfer network addressing information, user interface information, and a definition of the specific call center function to be performed to the just commissioned device.

The flow then proceeds to a configure device module 416 in order to configure the previously provisioned device. The configure device module 416 can transfer required parameters and enables to the targeted device. Some information that can be transferred can be but is not limited to the parameters required to control any other connected devices, such as operator consoles (not shown). Once the targeted device has been configured, the flow proceeds to a done state 418. At this point the process may be restarted for the next device in the first locale 102 or the second locale 104 of FIG. 1.

If the device found decision module 406 determines that the desired device has not responded appropriately to the broadcast discovery message, the flow proceeds to a verify media access code module 420. In the verify media access code module 420 an analysis of the respondents is made to determine whether an anomaly occurred that caused the incorrect response. Some of the possible anomalies could include, but are not limited to, bit errors in the transmission of response, a time-out on the response, or an incorrect media access code provided in the response.

The flow then proceeds to a correct media access code decision module 422. The correct media access code decision module 422 will sample the evidence provided by the verify media access code module 420, wherein the operator (not shown) of the commissioning terminal 110 of FIG. 1 is prompted to verify that the correct value of machine access code was previously requested, and proceed to the commission device block 408 to continue the process or determine that the error should be retried. If the error should be retried, the flow proceeds to a retry decision module 424. The retry decision module 424 will prompt the operator of the commissioning terminal 110 to determine if the operator desires to retry the operation. If the retry decision module 424 receives instruction from the operator that another attempt is desired, the flow returns to the broadcast discovery message module 404 to repeat the process. If however, the operator declines to retry the operation, the flow proceeds to a stop module 426.

Figure 5:
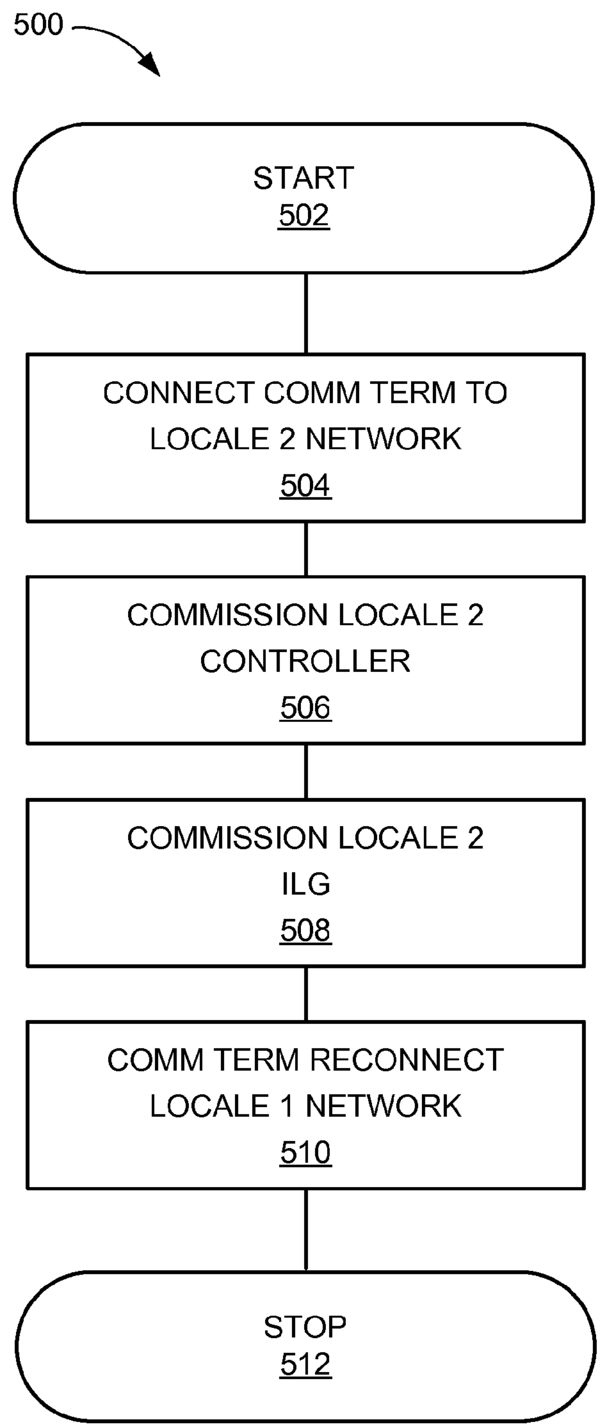
FIG. 5 is a flow chart of a remote commissioning process between the first locale and the second locale.

Referring now to FIG. 5, therein is shown a flow chart of a remote commissioning process 501 between the first locale 102 of FIG. 1 and the second locale 104 of FIG. 1. The flow chart of the remote commissioning process 501 depicts preparatory steps that are taken such that some devices located in the second locale 104 of FIG. 1 may subsequently be commissioned via the commissioning terminal 110 located in the first locale 102.

Module 502 begins the process. In module 504, the commissioning terminal 110 is temporarily relocated so that it is connected to the network which forms the communication medium for the second locale 104 of FIG. 1. This is necessary in that the protocol specific messages by which commissioning is performed are not capable of passing over an Internet Protocol based network wherein IP routers must be traversed. It is necessary, therefore, for commissioning terminal 110 to be directly connected to a Layer 2 networking medium of second locale 104 at least so long as required to commission the second locale controller 116 of FIG. 1 and the second inter-locale gateway 114 of FIG. 1.

Module 506 consists of performing the assisted-configuration 401 of FIG. 4 on the second locale controller 116. Module 508 consists of performing the assisted-configuration 401 on the second locale controller 116. Module 510 consists of relocating the commissioning terminal 110 from the physical network of the second locale to the physical network of the first locale 102.

An alternate method of commissioning the second locale controller 116 and the second inter-locale gateway 114 can be temporarily attached to the physical network of the first locale 102, while performing the assisted-configuration 401 with them attached to that network. Operationally, this may be preferable to relocating the commissioning terminal 110 and provides the same results as the first method.

Having so commissioned the second locale controller 116 and the second inter-locale gateway 114 in this manner, it is now possible to "remotely" commission other devices in second locale 104 via a protocol tunneling mechanism by which protocol specific messages are passed through a path consisting of the first locale controller 108, the first inter-locale gateway 112 of FIG. 1, the second inter-locale gateway 114, and the second locale controller 116.

Figure 6:
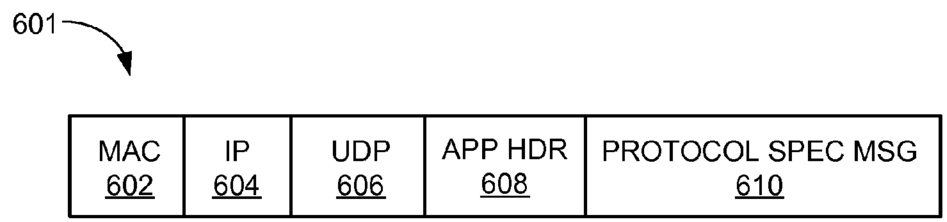
FIG. 6 shown a block diagram of a storage element for loading a protocol specific message.

Referring now to FIG. 6, therein is shown a block diagram of a storage element 601 for loading a protocol specific message. The block diagram of the storage element 601 the protocol specific message encapsulated in an Internet Protocol datagram using the Unit Datagram Protocol (UDP) for message delivery. The encapsulated protocol specific message is in a form which is identical to its description related to FIG. 2. FIG. 6 depicts a series of segments for storing a machine access code (MAC) 602, an Internet protocol address (IP) 604, a unit datagram protocol (UDP) 606, an application header 608, and a protocol specific message 610.

Figure 7:
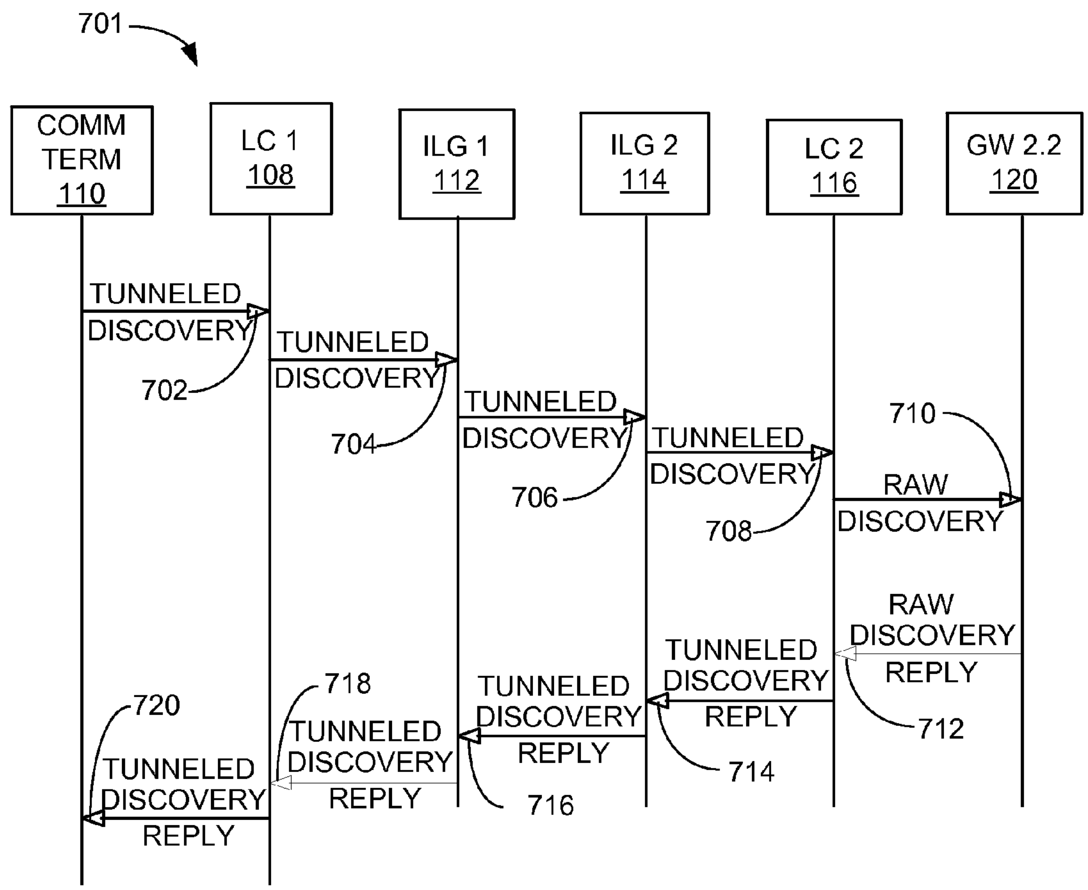
FIG. 7 is a message exchange chart for performing a remote commissioning of the second gateway, of FIG. 1.

Referring now to FIG. 7, therein is shown a message exchange chart 701 for performing a remote commissioning of the second gateway 120. The message exchange chart 701 depicts a network message exchange by a tunneled protocol specific message 702 as it passes from the commissioning terminal 110 to the first locale controller 108. A second tunneled protocol specific message 704 is sent from the first locale controller 108 to the first inter-locale gateway 112.

A third tunneled protocol specific message 706 is sent from the first inter-locale gateway 112 to the second inter-locale gateway 114. A fourth tunneled protocol specific message 708 is sent from the second inter-locale gateway 114 to the second locale controller 116. Since the second locale controller 116 is directly attached to the device that is being commissioned, it sends a raw discovery message 710 to the second gateway 120. Once the second gateway 120 has processed the raw discovery message 710, a raw discovery reply 712 is sent from the second gateway 120 to the second locale controller 116.

The second locale controller 116 can formulate a first tunneled discovery reply 714 and send it to the second inter-locale gateway 114. A second tunneled discovery reply 716 can be sent from the second inter-locale gateway 114 to the first inter-locale gateway 112. A third tunneled discovery reply 718 is sent from the first inter-locale gateway 112 to the first locale controller 108. A fourth tunneled discovery reply 720 is sent from the first locale controller 108 to the commissioning terminal 110 to complete the remote commissioning process.

It should be understood that FIG. 7 is simplified example to illustrate protocol specific message behavior as it applies only to the second gateway 120, and that replies would also be expected from other devices in the second locale 104 of FIG. 1, as the protocol specific message sent from the commissioning terminal 110 will have solicited replies from all of the devices in the second locale 104.

Upon receipt of fourth tunneled protocol specific message 708, the second locale controller 116 transmits the raw discovery message 710, by removing its encapsulating header (consisting of the MAC 602, the IP 604, the UDP 606, and APP HDR 608 as depicted in FIG. 6) and substituting the machine access code for the commissioning terminal 110. This results in a layer 2 broadcast of the Discovery protocol specific message on the physical network of second locale 104, with the second locale controller 116 indicated as the source of the broadcast. All devices which are capable of receiving and correctly interpreting the protocol specific messages are thereby prompted to reply with a unicast of the raw discovery reply 712 as a protocol specific message, with destination being the machine access code of the second locale controller 116.

The second locale controller 116 receives all such replies as the raw discovery reply 712, and subsequently encapsulates them with the tunneling protocol format as defined in FIG. 6 and forwards them to the second inter-locale gateway 114.

Each of the intermediate elements in the path between the commissioning terminal 110 and the second locale controller 116 can relay the encapsulated protocol specific message according to the rules of an application specific transport protocol whose behavior is one of simple "store and forward" delivery.

It is worth noting that when the commissioning terminal 110 is performing "remote" commissioning of devices in the second locale 104, it must tunnel its protocol specific messages and does not emit them in their "raw" form directly into the physical network of the first locale 102. For this reason, it should be noted that the commissioning terminal 110 must know that it is performing commissioning on a locale other than its own, and must use the tunneling form of protocol encapsulation to effect protocol specific message delivery. For these purposes, the commissioning terminal 110 uses the identity of second locale controller 116 as the destination for the tunneled messages it is sending to the second locale 104.

Likewise, replies enter the second locale controller 116 as the raw discovery reply 712 with a destination address of the second locale controller 116. It is the responsibility of the second locale controller 116 to recognize that these messages are to be encapsulated and forward via tunneling to the commissioning terminal 110 utilizing the identity of the commissioning terminal 110 other than its machine access code, such as the commissioning terminal 110 IP address 604 of FIG. 6.

Figure 8:
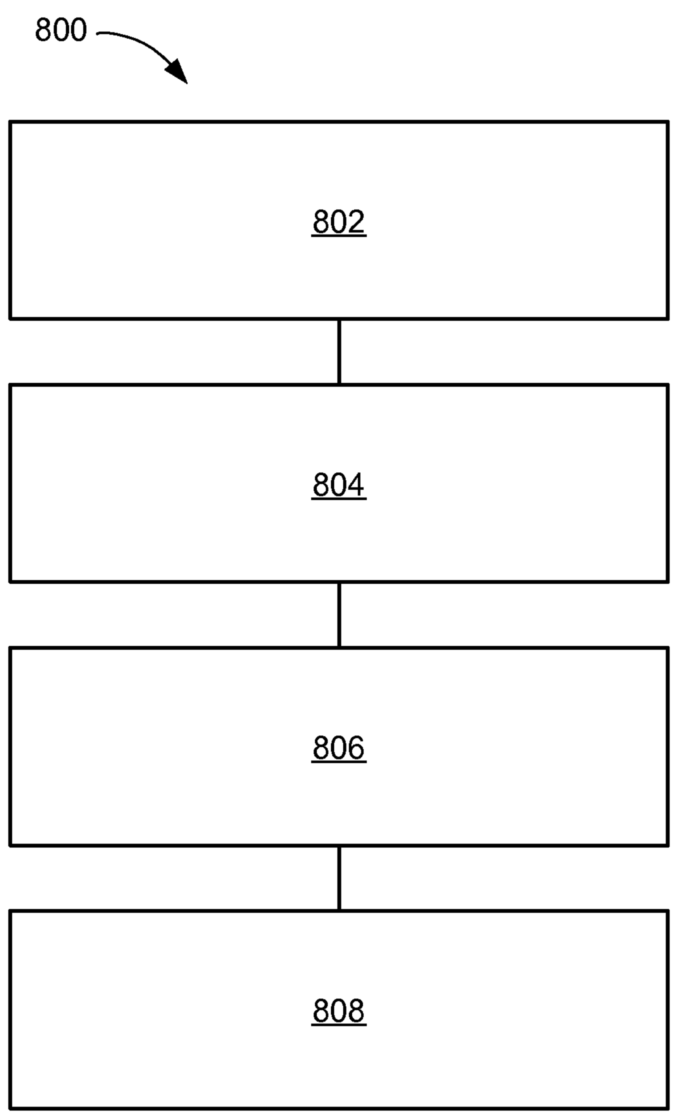
FIG. 8 is a flow chart of a method of operation of a call center system in a further embodiment of the present invention.

Referring now to FIG. 8, therein is shown a flow chart of a method 800 of operation of the call center system 100 in a further embodiment of the present invention. The method 800 includes: providing a commissioning terminal in a first locale in a block 802; providing a hardware device coupled to the commissioning terminal in a block 804; provisioning a first locale controller from the hardware device by the commissioning terminal in a block 806; and managing an inter-locale gateway, by the first locale controller, for commissioning a second gateway in a second locale in a block 808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a call center system comprising:

providing a commissioning terminal in a first locale;

providing a hardware device coupled to the commissioning terminal;

provisioning a first locale controller from the hardware device by the commissioning terminal including configuring the first local controller; and managing an inter-locale gateway, by the first locale controller, for commissioning a second gateway in a second locale;

wherein managing the inter-locale gateway, by the first locale controller includes configuring the first locale controller and the inter-locale gateway after they have been commissioned and provisioned by the commissioning terminal.

2. The method as claimed in claim 1 further comprising provisioning a first gateway from a hardware device previously commissioned by the commissioning terminal.

3. The method as claimed in claim 1 further comprising:

coupling an extended network between the first locale and the second locale; and commissioning a second gateway in the second locale by the commissioning terminal in the first locale.

4. The method as claimed in claim 1 further comprising providing a storage element in the first locale controller for receiving and forwarding a protocol specific message.

5. A method of operation of a call center system comprising:

providing a commissioning terminal in a first locale;

coupling a local network to the commissioning terminal;

providing a hardware device coupled to the commissioning terminal by the local network;

provisioning a first locale controller from the hardware device by the commissioning terminal including provisioning and configuring the first locale controller; and managing an inter-locale gateway, by the first locale controller, for commissioning a second gateway in a second locale including sending a protocol specific message to the second locale controller;

wherein managing the inter-locale gateway, by the first locale controller includes configuring the first locale controller and the inter-locale gateway after they have been commissioned and provisioned by the commissioning terminal.

6. The method as claimed in claim 5 further comprising provisioning a first gateway from a hardware device previously commissioned by the commissioning terminal including applying a provision device module after verifying by a commission successful decision module.

7. The method as claimed in claim 5 wherein managing the inter-locale gateway, by the first locale controller includes configuring the first locale controller and the inter-locale gateway after they have been commissioned and provisioned by the commissioning terminal includes managing a first inter-locale gateway in the first locale and a second inter-locale gateway in the second locale.

8. The method as claimed in claim 5 further comprising:

coupling an extended network between the first locale and the second locale; and commissioning a third gateway in the second locale by the commissioning terminal in the first locale.

9. The method as claimed in claim 5 further comprising providing a storage element in the first locale controller for receiving and forwarding the protocol specific message including receiving an organizationally unique identifier in the storage element.

10. A call center system comprising:

a commissioning terminal in a first locale;

a hardware device coupled to the commissioning terminal;

a first locale controller provisioned from the hardware device and configured by the commissioning terminal; and an inter-locale gateway, managed by the first locale controller, for commissioning a second gateway in a second locale;

wherein the inter-locale gateway, managed by the first locale controller includes the first locale controller and the inter-locale gateway configured after they have been commissioned and provisioned by the commissioning terminal.

11. The system as claimed in claim 10 further comprising a first gateway provisioned from a hardware device by the commissioning terminal.

12. The system as claimed in claim 10 wherein the inter-locale gateway, managed by the first locale controller includes the first locale controller and the inter-locale gateway configured by a configure device module operated by the commissioning terminal.

13. The system as claimed in claim 10 further comprising:

a second inter-locale gateway between the first locale and the second locale controller; and a third gateway in the second locale commissioned by the commissioning terminal in the first locale.

14. The system as claimed in claim 10 further comprising a storage element in the first locale controller for receiving and forwarding a protocol specific message.

15. The system as claimed in claim 10 further comprising a local network coupled to the commissioning terminal.

16. The system as claimed in claim 15 further comprising a first gateway provisioned from a hardware device that was previously commissioned by the commissioning terminal including a provision device module applied after a commission successful decision module.

17. The system as claimed in claim 15 wherein the inter-locale gateway, managed by the first locale controller includes the first locale controller and the inter-locale gateway configured by a configure device module operated by the commissioning terminal includes a second inter-locale gateway in the second locale coupled to a first inter-locale gateway in the first locale.

18. The system as claimed in claim 15 further comprising:

a second inter-locale gateway between the first locale and the second locale controller;

a second gateway in the second locale commissioned by the commissioning terminal in the first locale; and a third gateway in the second locale commissioned by the commissioning terminal in the first locale.

19. The system as claimed in claim 15 further comprising a storage element in the first locale controller for receiving and forwarding the protocol specific message including receiving an organizationally unique identifier in the storage element.

* * * * *

UNITED STATES PATENT AND TRADEMARK OFFICE

CERTIFICATE OF CORRECTION

PATENT NO. : 8,681,961 B2
APPLICATION NO. : 13/449112
DATED : March 25, 2014
INVENTOR(S) : Stevens It is certified that error appears in the above-identified patent and that said Letters Patent is hereby corrected as shown below:

In the Claims:

Column 9, claim 1, line 40, delete "the first local controller;" and insert therefor --the first locale controller;--

Signed and Sealed this
Twelfth Day of August, 2014

Michelle K. Lee
*Deputy Director of the United States Patent and Trademark Office*